US012523025B2

(12) United States Patent
Pasma

(10) Patent No.: US 12,523,025 B2
(45) Date of Patent: Jan. 13, 2026

(54) AUTOFILL FAUCET AND METHODS FOR THE SAME

(71) Applicant: ASSA ABLOY Americas Residential Inc., New Haven, CT (US)

(72) Inventor: Kevin Pasma, Lake Forest, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 182 days.

(21) Appl. No.: 18/346,913

(22) Filed: Jul. 5, 2023

(65) Prior Publication Data

US 2024/0011265 A1 Jan. 11, 2024

Related U.S. Application Data

(60) Provisional application No. 63/358,660, filed on Jul. 6, 2022.

(51) Int. Cl.
| | | |
|---|---|---|
| *E03C 1/05* | (2006.01) | |
| *G01F 15/00* | (2006.01) | |
| *G01F 23/2962* | (2022.01) | |
| *G01F 25/20* | (2022.01) | |

(52) U.S. Cl.
CPC ............ *E03C 1/057* (2013.01); *G01F 15/003* (2013.01); *G01F 15/005* (2013.01); *G01F 23/2962* (2013.01); *G01F 25/20* (2022.01)

(58) Field of Classification Search
CPC ...... G01F 15/003; G01F 15/005; G01F 23/28; G01F 23/296; G01F 23/2962; G01F 25/20; E03C 1/057
See application file for complete search history.

(56) References Cited

U.S. PATENT DOCUMENTS

| | | | | |
|---|---|---|---|---|
| 4,572,253 A | * | 2/1986 | Farmer ................ | B67D 1/1238 367/908 |
| 4,798,232 A | * | 1/1989 | Stembridge .......... | B67D 1/1238 141/1 |

(Continued)

FOREIGN PATENT DOCUMENTS

| | | | | |
|---|---|---|---|---|
| KR | 10-2018-0109259 | | 10/2018 | |
| WO | WO-2012048405 A1 | * | 4/2012 | ............. A47J 31/44 |
| WO | 2022/072759 | | 4/2022 | |

OTHER PUBLICATIONS

PCT International Search Report and Written Opinion in International Application PCT/US2023/069635, mailed Oct. 23, 2023, 11 pages.

(Continued)

*Primary Examiner* — Nicolas A Arnett
(74) *Attorney, Agent, or Firm* — Merchant & Gould P.C.

(57) ABSTRACT

Autofill systems for faucets are configured to determine an interior height of a vessel that holds water and is positioned along a sensing axis of a distance sensor. The interior height of the vessel is based on a bottom surface and a top rim surface of the vessel measured concurrently by the distance sensor. The autofill system closes an electronic valve once a predetermined fill level within the vessel is reached to shut off water flow through a spray head. The predetermined fill level is based on water surface level within the vessel and the top rim surface measured concurrently by the distance sensor relative to the determined interior height of the vessel.

20 Claims, 6 Drawing Sheets

(56) References Cited

U.S. PATENT DOCUMENTS

| | | | | |
|---|---|---|---|---|
| 4,917,155 | A * | 4/1990 | Koblasz | B67D 1/1238 |
| | | | | 367/908 |
| 4,944,335 | A * | 7/1990 | Stembridge | G01F 23/296 |
| | | | | 367/908 |
| 6,394,153 | B2 * | 5/2002 | Skell | B67D 1/1238 |
| | | | | 141/351 |
| 7,232,111 | B2 * | 6/2007 | McDaniel | E03C 1/057 |
| | | | | 251/129.04 |
| 8,695,646 | B2 * | 4/2014 | Agam | G01S 15/87 |
| | | | | 141/94 |
| 8,813,794 | B2 * | 8/2014 | Ashrafzadeh | B67D 1/0888 |
| | | | | 141/192 |
| 10,947,708 | B2 * | 3/2021 | Chung | E03C 1/0404 |
| 11,702,826 | B2 * | 7/2023 | Song | E03C 1/057 |
| | | | | 4/675 |
| 2006/0200903 | A1 * | 9/2006 | Rodenbeck | G01S 17/04 |
| | | | | 4/623 |
| 2008/0105331 | A1 * | 5/2008 | You | B67D 1/0888 |
| | | | | 141/95 |
| 2016/0201306 | A1 * | 7/2016 | Shirai | G01S 7/4813 |
| | | | | 4/668 |
| 2017/0101766 | A1 * | 4/2017 | Blizzard | F16K 21/16 |
| 2019/0264427 | A1 * | 8/2019 | Chung | E03C 1/055 |
| 2020/0209897 | A1 * | 7/2020 | Smith | E03C 1/057 |
| 2021/0164200 | A1 * | 6/2021 | Chung | E03C 1/055 |
| 2021/0355663 | A1 * | 11/2021 | Obrist | E03C 1/057 |

OTHER PUBLICATIONS

PCT International Preliminary Report on Patentability in International Application PCT/US2023/069635, mailed Jan. 16, 2025, 8 pages.

\* cited by examiner

AUTOFILL FAUCET AND METHODS FOR THE SAME

CROSS-REFERENCE TO RELATED APPLICATIONS

This application claims priority to and the benefit of U.S. Provisional Application No. 63/358,660, filed Jul. 6, 2022, which is incorporated by reference herein in its entirety.

BACKGROUND

Faucets may be used for a wide variety of tasks, such as spraying objects for cleaning, dispensing water for soaking items to be cleaned, filling up pots for cooking, and many other tasks. In some situations, the faucet can be used to fill a vessel (e.g., pot, cup, sink, etc.) to a desired fill level. For example, a user may wish to fill a sink with water for soaking dishes, or may wish to fill a pot or kettle for boiling water. In these circumstances, the user will need to monitor the faucet until the vessel is filled and then shut-off the water. If the user fails to monitor the faucet and does not shut it off in time, the water level may rise higher than desired or possibly overflow.

Some known faucets include electronic controls that enable the faucet to be turned on/off in a hands-fee manor or by merely touching the faucet. Metered faucets are also known in which a specified volume of water can be dispensed when turned on (e.g., a 200 ml volume of water). Although metered faucets can be helpful when the amount of water to be dispensed is known, the types of faucets are ill-equipped to fill a vessel of unknown size up to a desired fill level. Accordingly, improvements are desired.

SUMMARY

The present disclosure relates generally to faucets with an autofill system. In one possible configuration, and by non-limiting example, faucets with a distance sensor that are configured to automatically fill a vessel are disclosed.

In an aspect, the technology relates to a faucet including: a faucet body; a spray head for dispensing water, the spray head including a single distance sensor oriented along a sensing axis; an electronic valve that controls flow of water through the spray head; and a controller operatively coupled to the distance sensor and the electronic valve, the controller configured to: determine an interior height of a vessel configured to hold water and positioned along the sensing axis via the distance sensor, wherein the interior height of the vessel is based on a bottom surface and a top rim surface of the vessel measured concurrently by the distance sensor; and close the electronic valve once a predetermined fill level within the vessel is reached to shut off water flow through the spray head, wherein the predetermined fill level is based on water surface level within the vessel and the top rim surface measured concurrently by the distance sensor relative to the determined interior height of the vessel.

In an example, the distance sensor includes an ultrasonic sensor. In another example, the ultrasonic sensor is configured to send and receive ultrasonic pulses while water flows through the spray head. In still another example, the ultrasonic pulses have a sound field that is greater than 3 inches wide in an orthogonal direction relative to the sensing axis. In yet another example, the spray head is detachable from the faucet body. In an example, the spray head is fixed to the faucet body.

In another example, a user interface is coupled to the controller and configured to set the predetermined fill level. In still another example, the predetermined fill level is based on a percentage of the interior height of the vessel, a fill distance from the bottom surface of the vessel, or a fill distance relative to the top rim surface of the vessel. In yet another example, the distance sensor is incorporated within a nozzle pattern of the spray head.

In another aspect, the technology relates to a method of operating a faucet having a faucet body and a spray head for dispensing water, the method including: receiving a predetermined fill level; determining an interior height of a vessel configured to hold water and positioned along a sensing axis via a single distance sensor disposed within the spray head, the interior height of the vessel is based on a bottom surface and a top rim surface of the vessel measured concurrently by the distance sensor; filling the vessel with water from the spray head and continuously monitoring a water surface level within the vessel via the distance sensor; and once the predetermined fill level is reached within the vessel, closing an electronic valve to shut off water flow through the spray head, wherein the predetermined fill level is based on the water surface level within the vessel and the top rim surface measured concurrently by the distance sensor relative to the interior height of the vessel.

In an example, the distance sensor is an ultrasonic sensor, the method further includes emitting ultrasonic pulses towards the vessel along the sensing axis from the ultrasonic sensor and receiving reflected ultrasonic pluses at the ultrasonic sensor. In another example, the ultrasonic pulses are emitted and received while water flows through the spray head. In still another example, the emitted ultrasonic pulses have a sound field that is greater than 3 inches wide in an orthogonal direction relative to the sensing axis. In yet another example, upon receipt of the reflected ultrasonic pluses, the method includes filtering reflected ultrasonic pules reflected from an underlying surface that the faucet is mounted above. In an example, the method further includes positioning the spray head outside of an interior of the vessel to determine the interior height of the vessel.

In another example, the spray head is detachable from the faucet body. In still another example, the spray head is fixed to the faucet body. In yet another example, the predetermined fill level is received at a user interface as a user input value. In an example, the predetermined fill level is based on a percentage of the interior height of the vessel, a fill distance from the bottom surface of the vessel, or a fill distance relative to the top rim surface of the vessel. In another example, the method further includes starting water flow from the spray head to fill the vessel with water, wherein starting water flow includes manually actuating a handle of the faucet or opening the electronic valve.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular examples of the present disclosure and therefore do not limit the scope of the present disclosure. The drawings are not to scale and are intended for use in conjunction with the explanations in the following detailed description. Examples of the present disclosure will hereinafter be described in conjunction with the appended drawings, wherein like numerals denote like elements.

DETAILED DESCRIPTION

Figure 1:
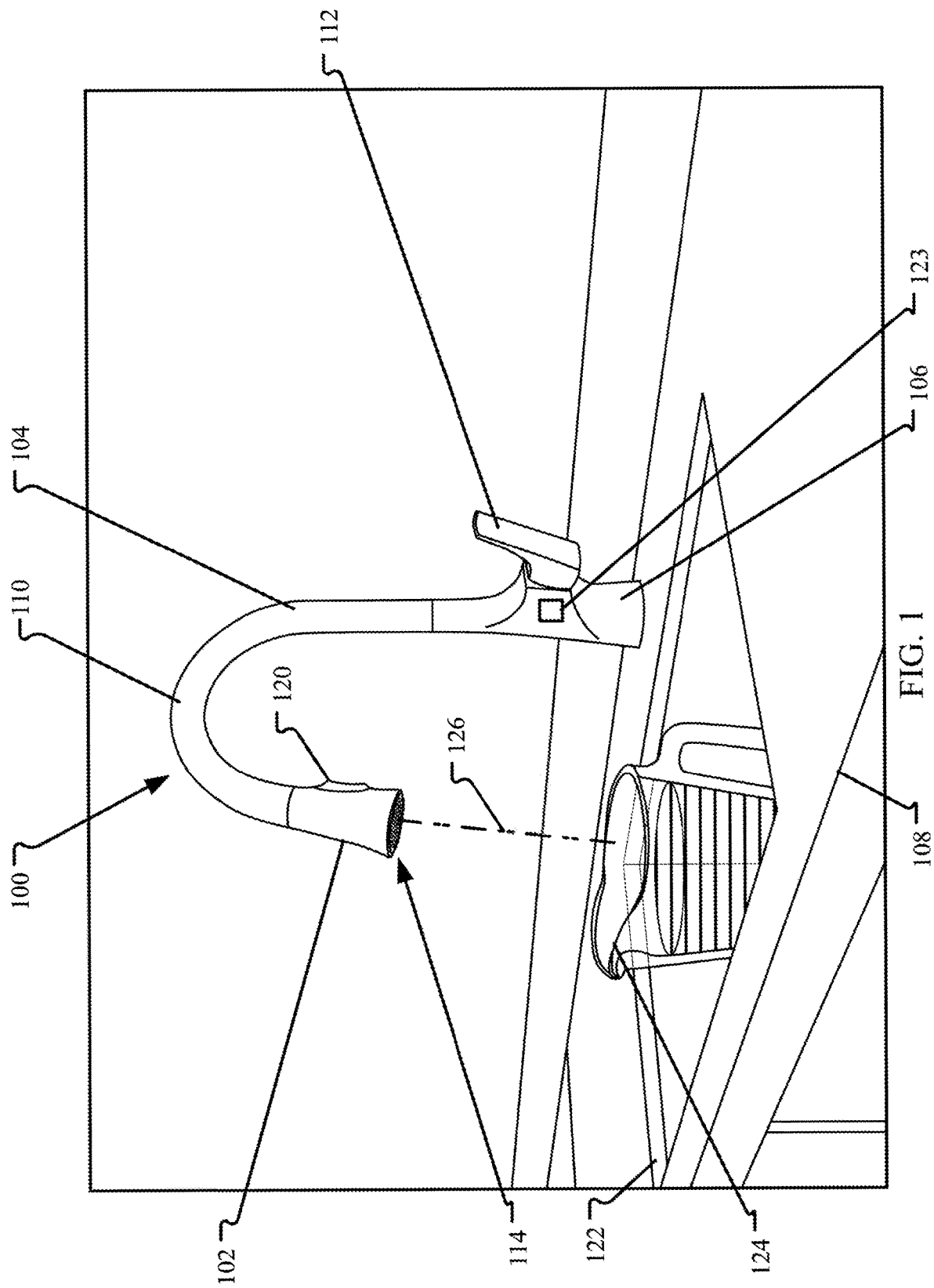
FIG. 1 is a perspective view of an exemplary faucet and in accordance with the principles of the present disclosure.

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible embodiments for the appended claims.

A faucet with an autofill system is described herein with increased performance. The autofill system includes a distance sensor that is able to detect two objects substantially aligned therewith. In an aspect, the distance sensor is a single ultrasonic sensor in the spray head of the faucet that is configured to detect either a bottom surface or a water level surface within a vessel and a top rim surface of the vessel. The autofill system can be set to fill the vessel to a measured depth or to a percentage of the container itself because an interior height of the vessel can be initially determined.

In examples, the faucet has a user interface for setting a fill level of the vessel to be filled. The fill level is based on an interior height of the vessel so that the vessel can be filled to a user-specified level regardless of the shape and size of the vessel. Additionally, calibration of the interior height of the vessel is simplified and does not require movement of the spray head relative to the vessel.

Figure 2:
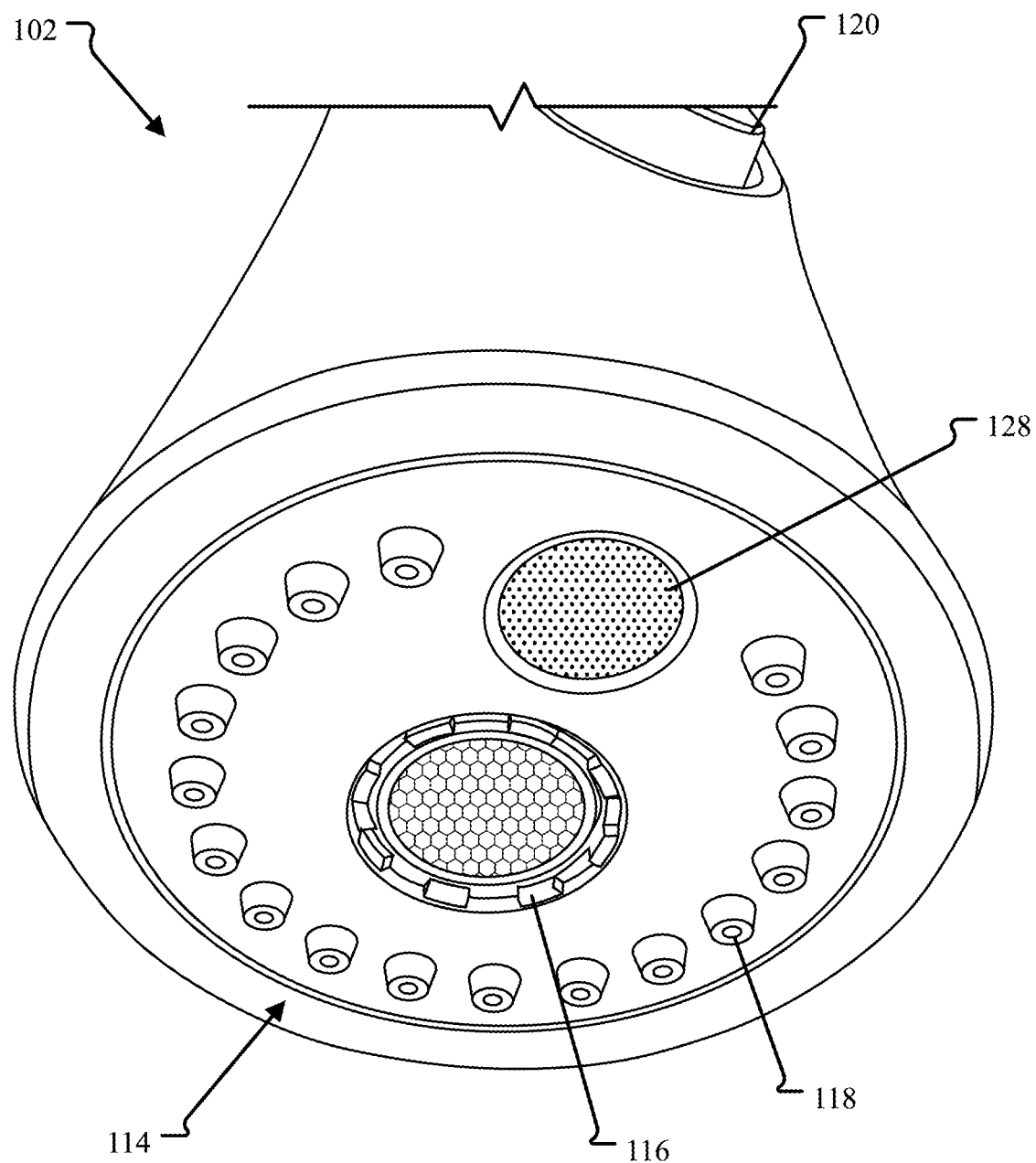
FIG. 2 is an enlarged view of a spray head of the faucet shown in FIG. 1.

FIG. 1 is a perspective view of an exemplary faucet 100. FIG. 2 is an enlarged view of a spray head 102 of the faucet 100. Referring concurrently to FIGS. 1 and 2, the faucet 100 includes a faucet body 104 and the spray head 102. The faucet body 104 includes a base 106 configured to be mounted on top of a countertop 108 and a spout 110. A handle 112 may extend from the base 106 for operational control of the faucet 100. For example, the handle 112 may enable a user of the faucet 100 to manually control flow rate and/or temperature of water through the faucet 100. The spray head 102 is coupled to a distal end of the spout 110 and is configured to discharge water from the faucet 100. In the example, the spray head 102 includes an outlet end 114 that defines a first nozzle 116 (e.g., a stream nozzle) and a second nozzle 118 (e.g., a plurality of spray nozzles), with a nozzle control button 120 that enables the spray type to be manually selectable by the user.

The spray head 102 may be removable from the faucet body 104 (e.g., so that the spray head 102 can be positioned remote from the distal end of the spout 110 and be moved towards various areas of a sink basin 122) or be fixed relative to the faucet body 104 as required or desired. In aspects, the spout 110 may rotate relative to the base 106 so as to position the spray head 102 relative to the sink basin 122. In some examples, the faucet 100 may additionally or alternatively include an electronic user interface 123 (shown schematically) for the user to electronically control operation of the faucet 100. For example, the faucet 100 may include a hands-free position or voice sensor to turn on/off water flow or otherwise adjust a flow rate and temperature, a touch activation sensor to turn on/off water flow or otherwise adjust a flow rate and temperature, and/or using one or more buttons or other interfaces to turn on/off or otherwise adjust a flow rate and temperature.

In operation, the user is configured to manually and/or electronically turn on and off the faucet 100 so that water can be dispensed from the spray head 102 and a vessel 124 (e.g., a water pitcher as shown) or the sink basin 122 can be filled with water. Generally, water is dispensed relative to a dispensing axis 126 that is substantially orthogonal to the outlet end 114 and typically in a downward vertical direction. The user can also adjust a flow rate of water and/or the temperature of water being dispensed from the spray head 102. This can be performed manually via the handle 112 or electronically as required or desired. The base 106 houses valves and other operational components (e.g., valve cartridges not shown) that enables the faucet 100 to operate as described herein. It is appreciated that while one example of a faucet 100 is described herein, the autofill features described further below can be used with any type of faucet as required or desired. For example, both kitchen and bath faucets. Pull-out, pull-down, single handle, double handle, touchless, built-in filtration, pot-filler, bar/prep, bridge, etc. faucet types. In still other aspects, the autofill features may be used in bath tub faucets so that a bath tub can automatically be filled to a predetermined fill level.

In the example, the autofill feature includes a distance sensor 128 that is incorporated within the spray head 102. The distance sensor 128 is oriented substantially along the dispensing axis 126 and configured to detect one or more distance parameters of the vessel 124 and any water contained therein as described herein so as to automatically fill the vessel 124 to a predetermined fill level. In aspects, the distance sensor 128 may be slightly off-angle from the dispensing axis 126 while still being able to detect the distance parameters as described herein.

In an aspect, the distance sensor 128 is an ultrasonic sensor that measures the distance to the vessel 124 and/or water therein using ultrasonic sound waves. The ultrasonic sensor includes a transducer that sends and receives ultrasonic pulses that relay back information about the proximity of the vessel 124 and/or water therein. The ultrasonic pulses are high-frequency sound waves that reflect from boundaries in order to produce distinct echo patters that can be used to determine the parameters of the vessel 124 and/or the water therein. The ultrasonic sensor can determine a distance from the distance sensor 128 to the vessel 124 and/or the water therein by measuring time of flight of the ultrasonic pulses between sending the pulses and receiving the pulses back. The amplitude of the received pulses may also be used so as to filter out undesirable noise or echoes from non-vessel surfaces. By using ultrasonic sound waves, clear objects (e.g., glass cups and pitchers, water, clear plastic, etc.) are enabled to return reflected sound waves so that the distance thereto can be determined. Additionally, the ultrasonic sensor can work in any lighting condition (e.g., low light, sunlight, etc.). In an example, the ultrasonic sensor may be a SmartSonic™ sensor from TDK Corporation that has an operating range from 4 cm to 1.2 m and a sample rate of up to 100 samples/second.

In other aspects, other types of distance sensors may be used as required or desired. For example, infrared distance sensors, laser distance sensors, LED distance sensors, radar sensors, and the like. In still other examples, cameras may be used with machine learning tools so as to determine and monitor the vessel 124 and the water being filled therein.

The distance sensor 128 is incorporated within a nozzle pattern of the spray head 102 at the outlet end 114. For example, the distance sensor 128 may be disposed towards the rear of the spray head 102 (e.g., below the nozzle control button 120 and behind the first nozzle 116) and within the array of the second nozzles 118. The distance sensor 128 is configured to operate without water being dispensed from the spray head 102 and with water being dispensed from the spray head 102 from either the first nozzle 116 or the second nozzles 118. In the example, the distance sensor 128 is mounted on the same surface of the outlet end 114 as both the first nozzle 116 and the second nozzles 118. In the example, by positioning the distance sensor 128 directly adjacent to the nozzles 116, 118, the distance sensor 128 has a direct line of sight towards the vessel 124 and can receive reflected ultrasonic sound waves. In contrast, if the distance sensor 128 is offset from the dispensing axis 126 and away from the nozzles 116, 118, accuracy of the distance sensor can decrease.

Figure 3:
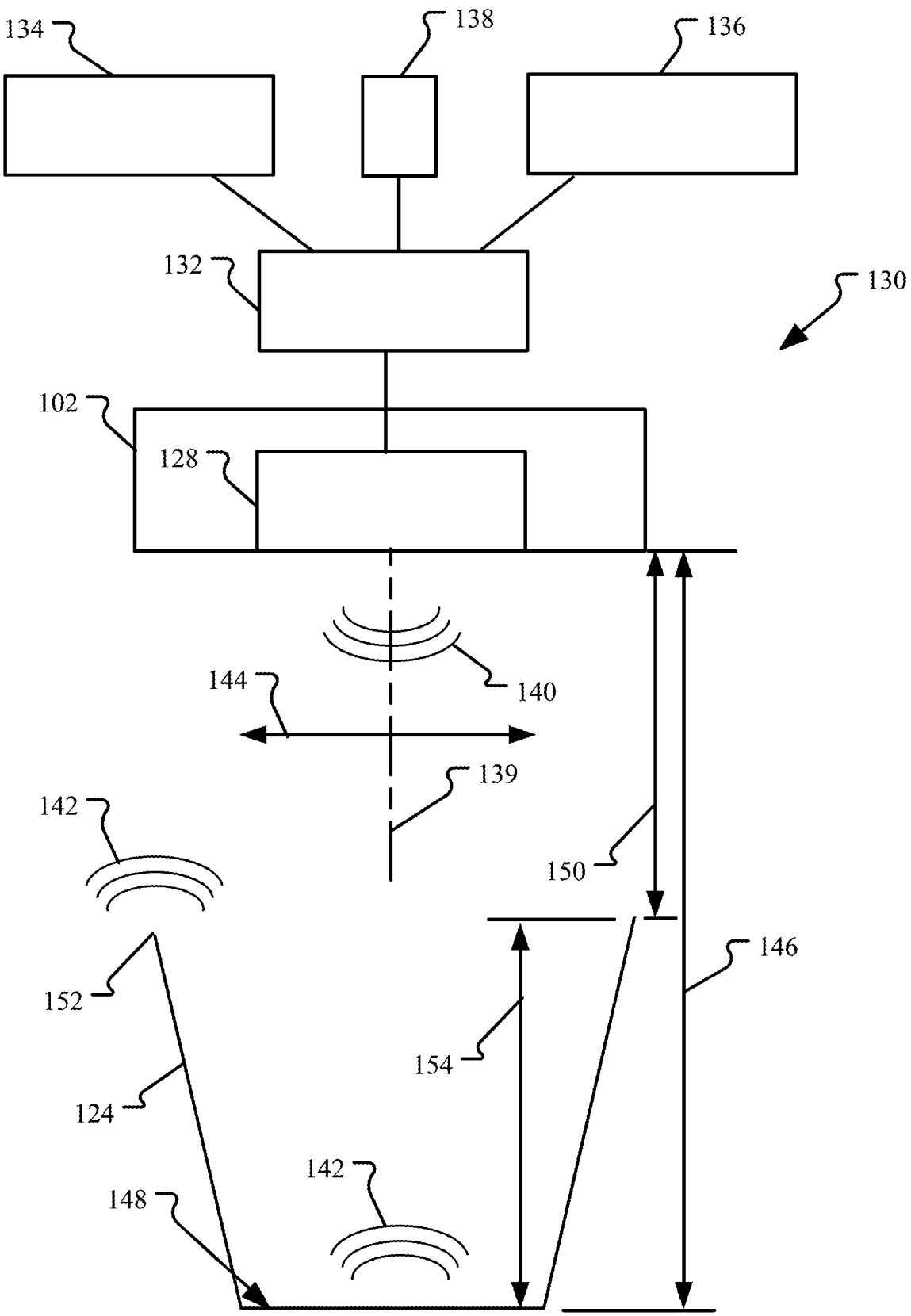
FIG. 3 is a schematic view of an autofill system for the faucet shown in FIG. 1 with a vessel being empty of water.

FIG. 3 is a schematic view of an autofill system 130 for the faucet 100 (shown in FIG. 1) with the vessel 124 being empty of water. The autofill system 130 includes the distance sensor 128 that is operably coupled to a controller 132. The controller 132 is also operably coupled to one or more electronic valves 134 that are configured to control flow of water through the faucet 100 for dispensing water from the spray head 102. For example, the electronic valves 134 selectively open and close hot and cold water lines (not shown) for the faucet 100 so as to control water flow and/or temperature of the water dispensed from the spray head 102. A user interface 136 is also operatively coupled to the controller 132 so that the user can input one or more values (e.g., a predetermined fill level) for control of the autofill system 130. The autofill system 130 is coupled to a power source 138 so that electronic power is provided to the components therein. The power source 138 may be a battery source or the faucet 100 may be coupled to an electrical outlet for the building structure as required or desired.

To start and begin operation of the autofill system 130, the user interface 136 may include a button, tab, dial, control and/or other input function to turn on the autofill system 130 and input a predetermined fill level value. In aspects, the user interface 136 may include a touch-sensitive display, an LED display, and LCD display, audible feedback, haptic feedback, and/or one or more indicator lights. For example, the faucet 100 may include a button and a dial to turn on the autofill system 130 and set or change a predetermined fill level value. In another example, the user interface 136 may be voice controlled so as to turn on the autofill system 130 and set or change the predetermined fill level value. Exemplary voice systems are described in International Application No. PCT/US2021/053059, filed Oct. 1, 2021, published as WO 2022/072759 on Apr. 7, 2022 and which is incorporated by reference herein in its entirety. In still other examples, proximity sensors may be used. In yet other examples, a remote device (e.g., a smart phone application or remote control) may be wirelessly (e.g., Bluetooth, WiFi, etc.) or by wire coupled to the autofill system 130 for control thereof and to turn on the autofill system 130 and set or change a predetermined fill level value.

In operation, the controller 132 is configured to operate the distance sensor 128 (e.g., an ultrasonic sensor) so as to emit ultrasonic pulses 140 along a sensing axis 139 and receive echoes 142 that reflect and return from the vessel 124 so that distance data can be collected. In an example, the distance sensor 128 may be a low power, always-on sensor that is continuously emitting and receiving ultrasonic sound waves at preset time interval sampling rates. In this example, in order to begin using the autofill system 130, an on/off input button may be used to begin capturing data from the distance sensor 128. In other examples, the user interface 136 may include an on/off input button as described above to turn on the autofill system 130 and prompt the distance sensor 128 to begin emitting and receiving ultrasonic sound waves at preset time interval sampling rates and start collecting data. In the example, the sensing axis 139 may be substantially parallel to the dispensing axis 126 (shown in FIG. 1) of the spray head 102.

In an aspect, a sound field 144 of the emitted ultrasonic sound waves 140 from the distance sensor 128 is greater than 3 inches wide in an orthogonal direction relative to the sensing axis 139. By spreading out the ultrasonic sound waves in a plane that is orthogonal to the sensing axis 139, obtaining distance measurements for larger vessels 124 (e.g., pots) is more easily enabled. In an aspect, the width of the sound field 144 is measured at least 1 inch away from the spray head 102. In another aspect, the sound field 144 may be set at angular values up to 180° so as to avoid at least a portion of the nozzles 116, 118 (shown in FIG. 2).

When the vessel 124 is positioned along the sensing axis 139, the vessel 124 reflects ultrasonic sound waves 142 back towards the distance sensor 128. Based on the amplitude of the reflected waves and time of flight, a distance to the vessel 124 can be determined. For example, the distance sensor 128 is configured to detect at least two objects concurrently and can determine a distance 146 from a bottom surface 148 of the vessel 124 to the distance sensor 128 (e.g., a first object) and concurrently determine a distance 150 from a top rim surface 152 of the vessel 124 to the distance sensor 128 (e.g., a second object). Generally, the distance sensor 128 is capable of determining positions of at least two objects that are both positioned along the same sensing axis 139. As such, the bottom surface 148 will be the measured distance 146 that is greater than the measured distance 150 of the top rim surface 152 so as to distinguish the closer object from the further object. As such, the distance sensor 128 can distinguish between two or more objects (e.g., the bottom surface 148 and the top rim surface 152) of the vessel 124 at the same time. In other aspects, the distance sensor 128 may be configured to detect more than two objects concurrently (e.g., three, four, etc.).

Generally, depending on the geometry of the vessel 124, the bottom surface 148 of the vessel 124 and the top rim surface 152 of the vessel 124 may be substantially parallel to each other so that each surface can reflect ultrasound waves back toward the distance sensor 128 and not away from the sensing axis 139. As such, the parts of the vessel 124 being measured are facing the same direction and the parts are positioned generally facing the distance sensor 128 when the vessel 124 is being filled with water. In an aspect, the bottom surface 148 and the top rim surface 152 are not orthogonal to each other.

Because the distances 146, 150 from the distance sensor 128 to the vessel 124 are known by the autofill system 130, an interior height 154 of the vessel 124 can be determined from the difference between the distance 146 of the bottom surface 148 and the distance 150 of the top rim surface 152. By knowing the interior height 154 of the vessel 124, the predetermined fill level can be set to a percentage of fill for the vessel 124. For example, the predetermined fill level may be 50% of the interior height 154 of the vessel 124. Other values are also contemplated herein from 1-100% (e.g., 60%, 70%, 75%, 80%, and the like). This predetermined fill level may be set by the user on the user interface 136. For example, setting a dial located on the faucet, or imputing a value through an application, voice control, haptics, or the like.

In other examples, the predetermined fill level can be set to a certain depth within the vessel 124. For example, the predetermined fill level may be 4 inches of water fill from the bottom surface 148. In other examples, the predetermined fill level may be a fill level to 2 inches below the top rim surface 152. Other values are also contemplated herein from 1-100 inches (e.g., 1 inch, 2 inches, and the like).

By using the distance sensor 128 as described herein and as long as the vessel 124 is within the sound field 144, the user can hold the vessel 124 at any number of positions relative to the distance sensor 128 without effecting the measured interior height 154. As such, the position of the spray head 102 is independent of the interior height 154 of the vessel 124. Additionally, the spray head 102 does not have to be moved towards the vessel 124 so as to generate an initial distance measurement. For example, in some known autofill systems, the spray head 102 has to detach from the faucet body 104 (shown in FIG. 1) so as to use side sensors to determine vessel wall height. However, not all faucets utilize detachable spray heads. Additionally, sensing detachment of the spray head adds excess components and complexity to the system. In contrast, the distance sensor 128 as described herein can be used with various shapes and sizes of vessels 124 and with various types of spray heads 102 because the position between the vessel 124 relative to the spray head 102 to determine the interior height 154 of the vessel 124 does not matter. Rather, the vessel 124 merely needs to be able to reflect ultrasonic sound waves and be within the range of the distance sensor 128.

In an aspect, the range of the distance sensor 128 may be based at least partially by the faucet and sink basin type so that the vessel 124 being positioned anywhere between the sink basin and the spray head 102 will trigger reflecting ultrasonic sound wave echoes 142 from the vessel 124. In some examples, the distances between the spray head 102 and the inner walls of the sink basin may be stored by the controller 132 so that if the distance sensor 128 receives reflected ultrasonic sound waves from the inner walls of the sink basin, detection of the sink basin can be filtered out if it is not the sink basin being filled. However, the interior height 154 of the vessel 124 is not based on the distance sensor 128 determining any distance to an underlying surface of the vessel 124 and is based only from measurements of the vessel 124 itself. This configuration also allows for the vessel 124 to slightly move relative to the distance sensor 128 after the interior height 154 of the vessel 124 is determined. For example, if the user slightly repositions the vessel 124 relative to the distance sensor 128 (e.g., because of weight, changing hands, or other typical movement while filling up a vessel), the determination of the interior height 154 of the vessel 124 will not change as it is not based on the position of the vessel 124 relative to an underlying surface supporting the vessel 124.

Once the interior height 154 of the vessel 124 is determined, water may begin to be dispensed from the spray head 102 and into the vessel 124. To begin to fill the vessel 124, the user may manually operate the handle 112 (shown in FIG. 1) to set a flow rate and/or temperature of the water. In other examples, the autofill system 130 may be used to begin to fill the vessel 124 and open the electronic valve 134 and set the flow rate and/or temperature of the water. The electronic valve 134 may be automatically opened once the interior height 154 of the vessel 124 is determined or once a slight delay occurs (e.g., 2 seconds after calibration of the height of the vessel). In other examples, the electronic valve 134 may be automatically opened once a start command is received by the controller 132. The start command may be via an input button, a voice command, by the vessel 124 being within a field of view of a proximity sensor, or any other type of input as required or desired. When water is being dispensed from the spray head 102, the distance sensor 128 continues operation and continuously emits ultrasonic sound waves 140 at time interval sample rates so as to continually monitor the vessel 124 and the water therein as described further below in reference to FIG. 4.

Figure 4:
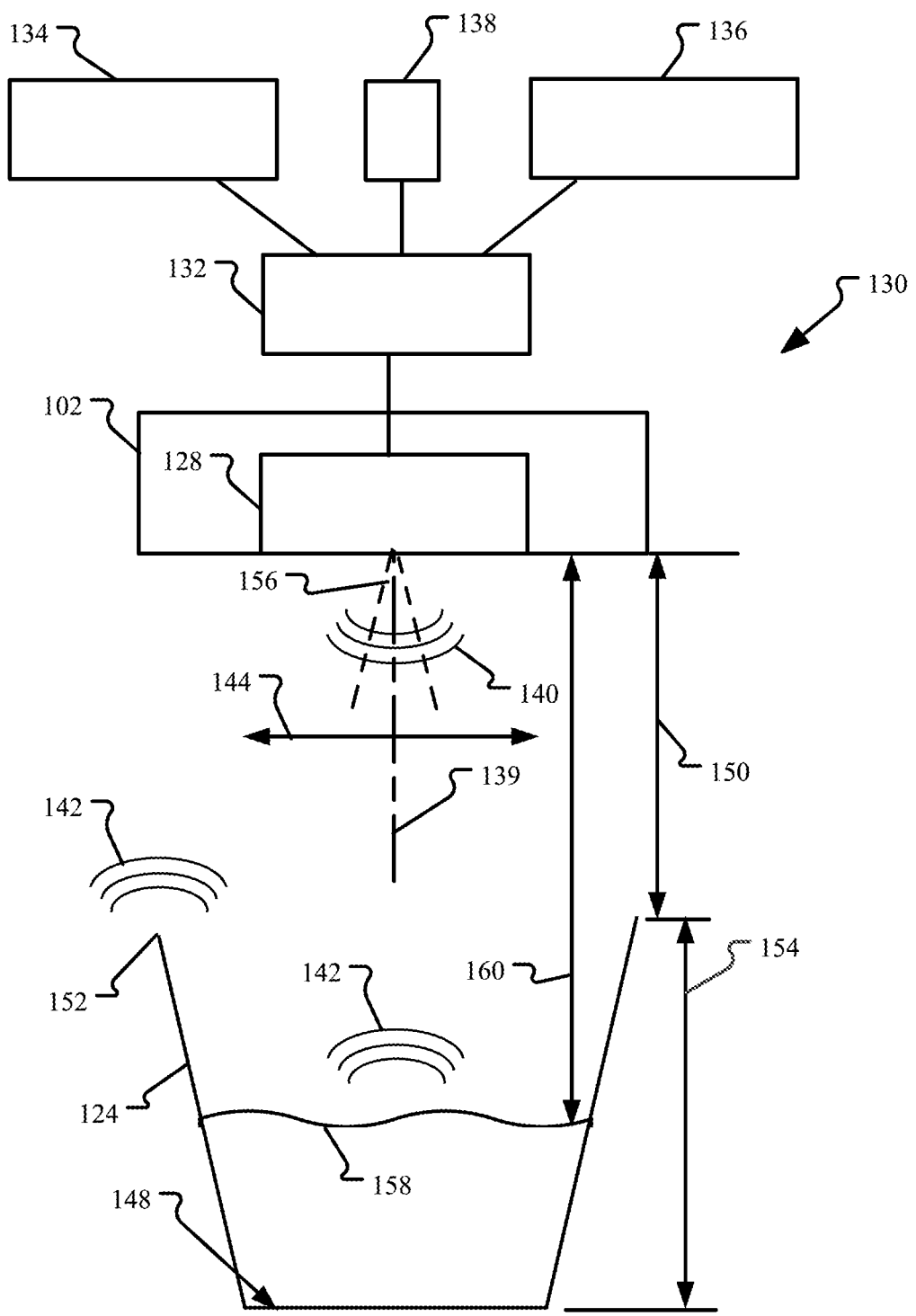
FIG. 4 is a schematic view of the autofill system for the faucet shown in FIG. 1 with the vessel being filled with water.

FIG. 4 is a schematic view of the autofill system 130 for the faucet 100 (shown in FIG. 1) with the vessel 124 being filled with water. Certain components are described above, and thus, not necessarily described further. As illustrated in FIG. 4, water flow 156 is being dispensed from the spray head 102 while the distance sensor 128 is continuing to emit ultrasonic pulses 140 and receiving ultrasonic echoes 142 from the vessel 124. Additionally, because water now at least partially fills the vessel 124, the bottom surface 148 no longer returns the echo 142, rather the ultrasonic pulses 140 are reflected from a water surface level 158 of the water contained within the vessel 124. As such, the distance sensor 128 is configured to continue measuring the distance 150 between the distance sensor 128 and the top rim surface 152 of the vessel 124, and a distance 160 between the distance sensor 128 and the water surface level 158 (e.g., now the second object).

Once the predetermined fill level (e.g., based on a percentage of fill or specified depth) is reached, the controller 132 can automatically shut off water flow through the spray head 102 via the electronic valve 134. In some examples, the water surface level 158 of the vessel 124 and the top rim surface 152 of the vessel 124 may be substantially parallel to each other (or may be modeled as such), so that each surface can reflect ultrasound waves back toward the distance sensor 128 and not away from the sensing axis 139. As such, the parts of the vessel 124 and water surface being measured are facing the same direction and are positioned generally facing the distance sensor 128 when the vessel 124 is being filled with water. In an aspect, the water surface level 158 and the top rim surface 152 are not orthogonal to each other.

With the controller 132 knowing the interior height 154 of the vessel 124 from the measurements taken prior to filing the vessel 124 with water, the controller 132 can operate the electronic valve 134 so as to shut off water flow 156 once a fill percentage of the vessel 124 is reached (e.g., 75%) or once there is a 2 inch depth of water in the vessel 124, or once the water in the vessel 124 is within 2 inches from the top rim surface 152. The distance sensor 128 measures the position of the water surface level 158 constantly with short time periods so that the current water level is accurately determined. In the example, the distance sensor 128 is configured to consistently measure the distance from the top rim surface 152 of the vessel 124. The controller 132 is configured to compare the water surface level 158 relative to the interior height 154 with the predetermined fill level to determine whether the electronic valve 134 should be turned off.

Once the electronic valve 134 shuts off the water flow 156 from the spray head 102, the autofill system 130 may turn off after a preset time or be manually turned off by the user. Once off, the autofill system 130 may automatically reset the interior height 154 calibration, or may store it for later use. Although the autofill system 130 is described as filling a vessel 124 from empty (e.g., the bottom surface 148), it is appreciated that the autofill system 130 may also fill a partially filled vessel with an initial water level. Once the initial water level is determined the autofill system 130 can add additional water and raise the water level as required or desired and described herein.

The autofill system 130 can also include an emergency stop function if the water surface level 158 reaches or gets too close to the top rim surface 152 (e.g., within 0.25 inches). For example, when the water surface level 158 equals the top rim surface 152.

Figure 5:
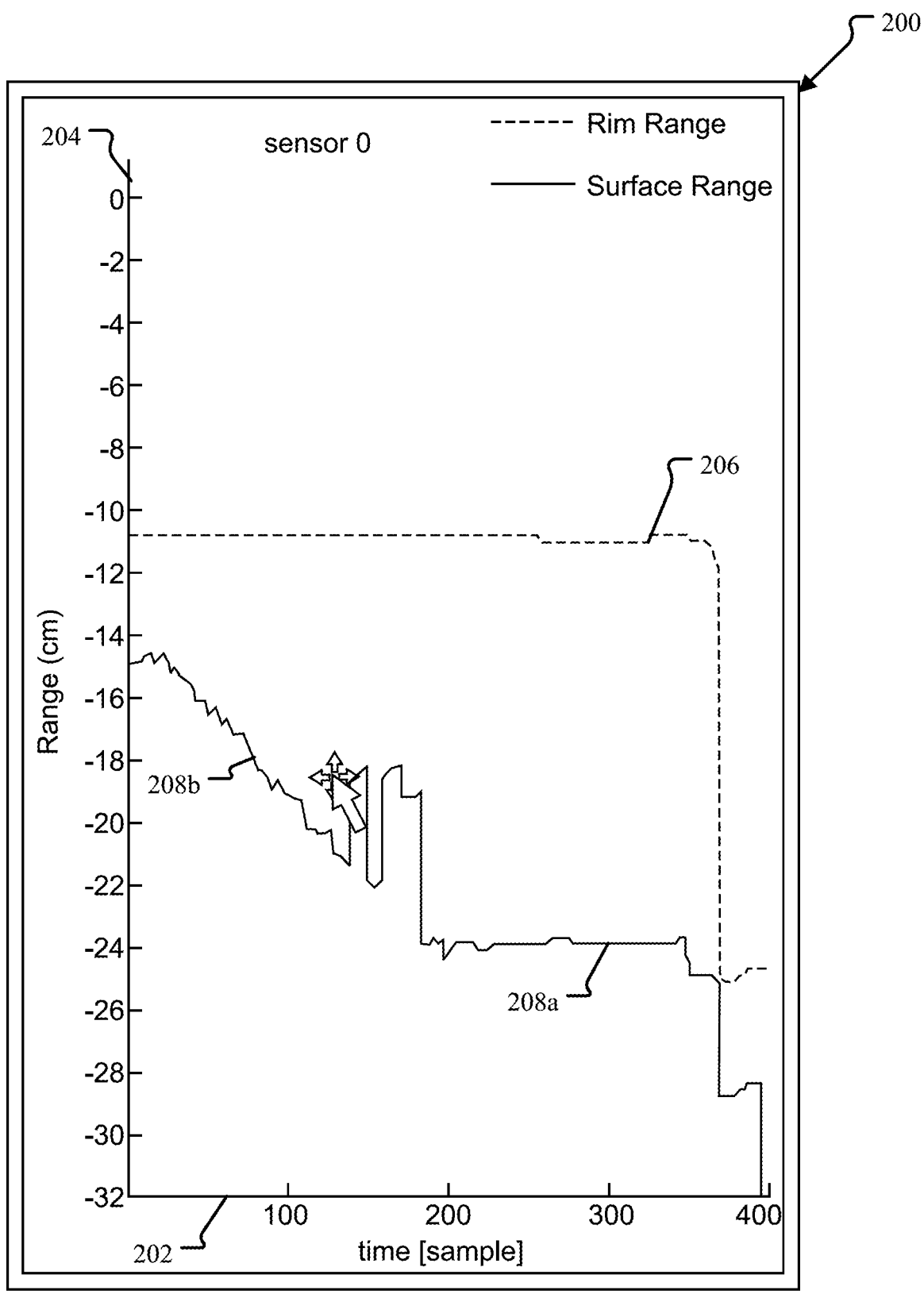
FIG. 5 is range graph generated by the autofill system shown in FIGS. 3-4.

FIG. 5 is range graph 200 generated by the autofill system 130 (shown in FIGS. 3-4). The graph 200 has an x-axis 202 representing sample time and a y-axis 204 representing range (e.g., distance) between the distance sensor 128 (shown in FIGS. 3-4) and the objects it is measuring distance to. As described above, the distance sensor 128 is configured to measure at least two different objects in its line of sight. A first line 206 represents the distance between the distance sensor 128 and the top rim surface 152 over time (e.g., distance 150 shown in FIGS. 3-4). With the vessel 124 being stationary, the first line 206 remains consistent over time as expected because the top rim surface 152 does not move. Additionally, because measurement is closer to the distance sensor, the autofill system can determine that this range value is the top rim surface.

A second line 208 represents the distance between the distance sensor 128 and the bottom surface 148 of the vessel 124 or water surface level 158 within the vessel 124 (e.g., distances 146, 160 shown in FIGS. 3-4). At the beginning of the distance sensor 128 capturing the vessel 124, the distance sensor 128 is measuring the bottom surface 148 of the vessel 124, and thus, the distance 146 is consistent over time as shown in section 208*a*. Once water is filling the vessel 124, the distance sensor 128 captures the water surface level within the vessel 124 over time as shown in section 208*b*. In section 208*b*, the water surface level is rising within the vessel 124 until the predetermined fill level is reached and the autofill system 130 shutting off the flow of water. With the second object being further from the distance sensor, the autofill system can determine that this range value is either the bottom surface or the water level. The water level can also be based on capturing the change in measured distance as vessels typically do not change shape.

As shown by FIG. 5, a single distance sensor as described herein is utilized to measure the top rim surface 152 and either the bottom surface 148 of the vessel 124 or the water level within the vessel 124 concurrently. This configuration increases performance and efficiencies of the autofill system 130 when compared to systems with more than one sensor. The distance sensor 128 is operable with the vessel 124 positioned at multiple locations relative to the spray head 102. Additionally, the interior height of the vessel 124 can be more easily determined.

Furthermore, by capturing the transition between the empty vessel at 208*a* (e.g., measuring the bottom surface 148) and a partially filled vessel at 208*b* (e.g., measuring the water surface level), the autofill system 130 can be used to fill vessels with a relatively low depth of water as required or desired. The autofill system 130 is not just used to determine the end fill height of the water within the vessel 124. As such, the autofill system 130 is not a metered system (e.g., dispensing a set volume of water to the vessel). Rather, the autofill system 130 described herein is a dynamic system that uses the same operational algorithm for autofilling vessels 124 of different sizes.

Figure 6:
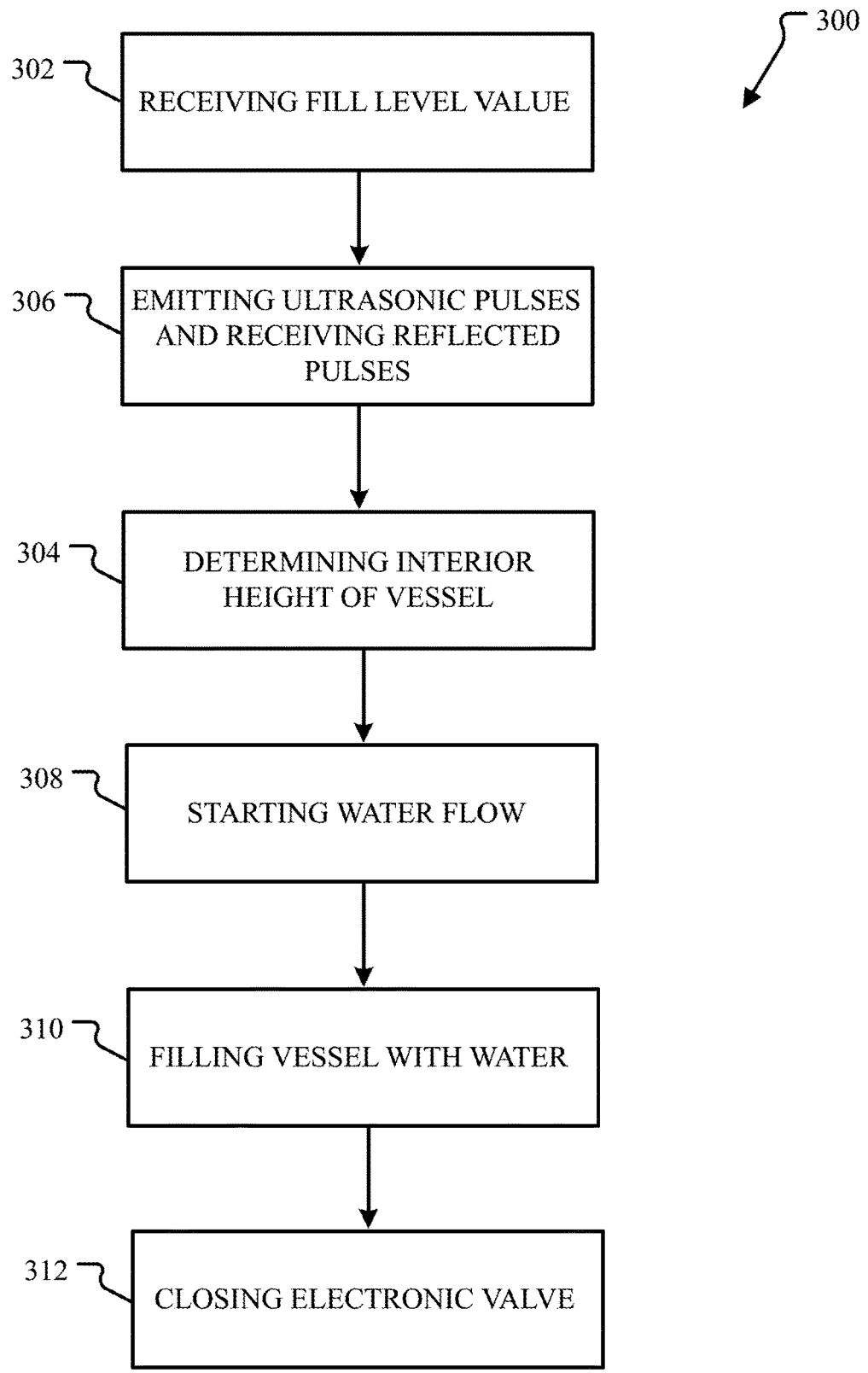
FIG. 6 is a flowchart illustrating an exemplary method of operating a faucet.

FIG. 6 is a flowchart illustrating an exemplary method 300 of operating a faucet. The faucet includes a faucet body and a spray head for dispensing water along a dispensing axis. The faucet may be the same or similar to the faucet 100 having the autofill system 130 described above in reference to FIGS. 1-5.

The method 300 may begin with receiving a predetermined fill level for a vessel (operation 302). In an example, the predetermined fill level may be received at a user interface as a user input value. The user interface may be physically on the faucet or via a remote application such as on a smart phone. In an aspect, the predetermined fill level may be based on a percentage of an interior height of the vessel. In another aspect, the predetermined fill level may be a fill distance or depth from a bottom surface or top surface of the vessel. Other input values for the predetermined fill level are also contemplated herein. For example, a predetermined fill volume may be provided (e.g., 4 cups) with a control distance relative to a top rim surface of the vessel (e.g., not within 1 inch from the top rim surface). As such, the different size vessels can be filled with similar water volume, but if the vessel is too small, overfill will be reduced or prevented.

An interior height of the vessel configured to hold water and positioned along a sensing axis is determined via a single distance sensor disposed within the spray head (operation 304). In the example, the interior height may be based on a bottom surface and a top rim surface of the vessel measured concurrently by the distance sensor. In some examples, the bottom surface and the top rim surface may be substantially parallel to each other. The distance sensor may be an ultrasonic sensor such that the method 300 includes emitting ultrasonic pulses towards the vessel along the sensing axis from the ultrasonic sensor and receiving reflected ultrasonic pluses at the ultrasonic sensor (operation 306) so as to determine the distance to the vessel. In an example, the emitted ultrasonic pulses may have a sound field that is greater than 3 inches wide in an orthogonal direction relative to the sensing axis. By increasing the sound field of the ultrasonic sensor, wide vessels such as pots and pans still may be used with the autofill system described herein.

With the interior height of the vessel known, water flow can be started through the spray head to fill the vessel with water (operation 308). Starting water flow may include manually actuation a handle of the faucet or electronically opening one or more electronic valves. Water then fills the vessel from the spray head while the distance sensor continuously monitors a water surface level within the vessel (operation 310). The ultrasonic pulse are emitted from the distance sensor and received while the water flows through the spray head. In the example, the distance sensor seamlessly transfers distance measurements between the bottom surface of the vessel and the water level as they both can be considered second objects by the distance sensor.

Once the predetermined fill level is reach within the vessel, an electronic valve is closed to shut off water flow through the spray head (operation 312). In the example the predetermined fill level is based on the water surface level within the vessel and the top rim surface measured concurrently by the distance sensor relative to the interior height of the vessel. In an example, the water surface level and the top rim surface being substantially parallel to each other.

When the interior height of the vessel is determined (operation 304), the spray head is positioned outside of the interior of the vessel. The spray head is not positioned within the interior of the vessel for calibrating the interior height. This configuration enables for the spray head to be fixed to the faucet body or to be detachable from the faucet body as required or desired. Additionally, the position of the spray head relative to the faucet body does not need to be tracked or measured. In some example, at least a portion of the reflected ultrasonic pulses received at the distance sensor may be ignored or filtered out. For example, if an underlying surface that the vessel is sitting on (e.g., a sink basin or a countertop) reflects sound waves, these can be filtered out so that only the reflected ultrasonic sound waves from the vessel itself is used for the autofill system.

References in the specification to "one example," "an example," "an illustrative example," etc., indicate that the example described may include a particular feature, structure, or characteristic, but every example may or may not necessarily include that particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C). Moreover, one having skill in the art will understand the degree to which terms such as "about," "approximately," or "substantially" convey in light of the measurements techniques utilized herein. To the extent such terms may not be clearly defined or understood by one having skill in the art, the term "about" shall mean plus or minus ten percent.

From the forgoing detailed description, it will be evident that modifications and variations can be made in the aspects of the disclosure without departing from the spirit or scope of the aspects. While the best modes for carrying out the many aspects of the present teachings have been described in detail, those familiar with the art to which these teachings relate will recognize various alternative aspects for practicing the present teachings that are within the scope of the appended claims.

What is claimed:

1. A faucet comprising:
    a faucet body;
    a spray head for dispensing water, the spray head including a single distance sensor oriented along a sensing axis;
    an electronic valve that controls flow of water through the spray head; and
    a controller operatively coupled to the distance sensor and the electronic valve, the controller configured to:
        determine an interior height of a vessel configured to hold water and positioned along the sensing axis via the distance sensor, wherein the interior height of the vessel is based on a bottom surface and a top rim surface of the vessel measured concurrently by the distance sensor, and wherein the interior height of the vessel is the difference between a first distance measured between the distance sensor and the bottom surface of the vessel and a second distance measured between the distance sensor and the top rim surface of the vessel; and
        close the electronic valve once a predetermined fill level within the vessel is reached to shut off water flow through the spray head, wherein the predetermined fill level is based on water surface level within the vessel and the top rim surface measured concurrently by the distance sensor relative to the determined interior height of the vessel.

2. The faucet of claim 1, wherein the distance sensor comprises an ultrasonic sensor.

3. The faucet of claim 2, wherein the ultrasonic sensor is configured to send and receive ultrasonic pulses while water flows through the spray head.

4. The faucet of claim 3, wherein the ultrasonic pulses have a sound field that is greater than 3 inches wide in an orthogonal direction relative to the sensing axis.

5. The faucet of claim 1, wherein the spray head is detachable from the faucet body.

6. The faucet of claim 1, wherein the spray head is fixed to the faucet body.

7. The faucet of claim 1, further comprising a user interface coupled to the controller and configured to set the predetermined fill level.

8. The faucet of claim 7, wherein the predetermined fill level is based on a percentage of the interior height of the vessel, a fill distance from the bottom surface of the vessel, or a fill distance relative to the top rim surface of the vessel.

9. The faucet of claim 1, wherein the distance sensor is incorporated within a nozzle pattern of the spray head.

10. A method of operating a faucet having a faucet body and a spray head for dispensing water, the method comprising:
    receiving a predetermined fill level;
    determining an interior height of a vessel configured to hold water and positioned along a sensing axis via a single distance sensor disposed within the spray head, the interior height of the vessel is based on a bottom surface and a top rim surface of the vessel measured concurrently by the distance sensor, wherein the interior height of the vessel is the difference between a first distance measured between the distance sensor and the bottom surface of the vessel and a second distance measured between the distance sensor and the top rim surface of the vessel;
    filling the vessel with water from the spray head and continuously monitoring a water surface level within the vessel via the distance sensor; and
    once the predetermined fill level is reached within the vessel, closing an electronic valve to shut off water flow through the spray head, wherein the predetermined fill level is based on the water surface level within the vessel and the top rim surface measured concurrently by the distance sensor relative to the determined interior height of the vessel.

11. The method of claim 10, wherein the distance sensor is an ultrasonic sensor, the method further comprising emitting ultrasonic pulses towards the vessel along the sensing axis from the ultrasonic sensor and receiving reflected ultrasonic pulses at the ultrasonic sensor.

12. The method of claim 11, wherein the ultrasonic pulses are emitted and received while water flows through the spray head.

13. The method of claim 11, wherein the emitted ultrasonic pulses have a sound field that is greater than 3 inches wide in an orthogonal direction relative to the sensing axis.

14. The method of claim 11, further comprising upon receipt of the reflected ultrasonic pluses pulses, filtering reflected ultrasonic pulses reflected from an underlying surface that the faucet is mounted above.

15. The method of claim 10, further comprising positioning the spray head outside of an interior of the vessel to determine the interior height of the vessel.

16. The method of claim 15, wherein the spray head is detachable from the faucet body.

17. The method of claim 15, wherein the spray head is fixed to the faucet body.

18. The method of claim 10, wherein the predetermined fill level is received at a user interface as a user input value.

19. The method of claim 18, wherein the predetermined fill level is based on a percentage of the interior height of the vessel, a fill distance from the bottom surface of the vessel, or a fill distance relative to the top rim surface of the vessel.

20. The method of claim 10, further comprising starting water flow from the spray head to fill the vessel with water, wherein starting water flow includes manually actuating a handle of the faucet or opening the electronic valve.

\* \* \* \* \*